US006451224B1

(12) United States Patent
Wilson

(10) Patent No.: US 6,451,224 B1
(45) Date of Patent: Sep. 17, 2002

(54) STABLE FREE-FLOWING SOLID CHELANTS

(75) Inventor: David A. Wilson, Richwood, TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/889,390

(22) PCT Filed: Jul. 21, 1999

(86) PCT No.: PCT/US99/16510

§ 371 (c)(1), (2), (4) Date: Jul. 11, 2001

(87) PCT Pub. No.: WO00/12463

PCT Pub. Date: Mar. 9, 2000

(51) Int. Cl.[7] .......................... C09K 3/00; C09K 15/20; C11D 7/32; C11D 7/60

(52) U.S. Cl. .................. 252/182.29; 252/381; 252/384; 252/392; 252/403; 510/402; 510/443; 510/444; 510/452

(58) Field of Search ....................... 252/186.25, 186.33, 252/182.29, 381, 383, 392, 384, 403; 510/402, 401, 445, 452, 453, 443, 444

(56) References Cited

U.S. PATENT DOCUMENTS

| | | | | | |
|---|---|---|---|---|---|
| 3,607,931 | A | * | 9/1971 | Nashua | |
| 4,212,994 | A | * | 7/1980 | Wilson et al. | 562/568 |
| 4,259,200 | A | * | 3/1981 | Sims et al. | |
| 4,636,327 | A | * | 1/1987 | Frenier et al. | 134/3 |
| 5,292,446 | A | * | 3/1994 | Painter et al. | |
| 5,366,652 | A | * | 11/1994 | Capeci et al. | |
| 5,545,352 | A | * | 8/1996 | Pike | 510/514 |
| 5,641,739 | A | * | 6/1997 | Kott et al. | 510/372 |
| 5,668,098 | A | * | 9/1997 | Gutierrez et al. | 510/350 |
| 5,780,419 | A | * | 7/1998 | Doumen et al. | 510/452 |
| 5,958,866 | A | * | 9/1999 | Donoghue et al. | 510/452 |

FOREIGN PATENT DOCUMENTS

| | | | |
|---|---|---|---|
| EP | 0 225 309 B1 | 9/1990 | C02F/5/14 |
| EP | 0 708 078 A1 | 4/1996 | C07C/227/44 |
| EP | 0 796 911 A1 | 9/1997 | C11D/3/36 |

* cited by examiner

*Primary Examiner*—Joseph D. Anthony

(57) ABSTRACT

A stable free-flowing solid chelant composition is produced by the process comprising the steps of: a) adjusting the pH of an aqueous solution of the chelant to a value of from about 1.2 to about 3.0 by the addition of an inorganic acid; and b) drying the pH adjusted aqueous chelant product.

6 Claims, No Drawings

STABLE FREE-FLOWING SOLID CHELANTS

This invention relates to stable free-flowing solid chelants and a process for the preparation thereof.

Chelants or chelating agents are compounds which form coordinate covalent bonds with a metal ion to form chelates. Chelates are coordination compounds in which a central metal atom is bonded to two or more other atoms in at least one other molecule or ion (called ligand) such that at least one heterocyclic ring is formed with the metal atom as part of each ring.

Chelants are used in a variety of applications including food processing, soaps, detergents, cleaning products, personal care products, pharmaceuticals, pulp and paper processing, water treatment, metalworking and metal plating solutions, textile processing solutions, fertilizers, animal feeds, herbicides, rubber and polymer chemistry, photofinishing, and oil field chemistry.

Commercially available chelants are typically aqueous solutions having a chelant activity of about 40 percent to about 60 percent by weight.

Since in some of the above applications it would be advantageous and desirable to use solid free-flowing chelant, many attempts have been made to produce stable free-flowing solid chelants.

U.S. Pat. No. 4,259,200 (P. S. Sims et al) discloses phosphonates complexed with magnesium, zinc or aluminum ions, the molar ratio of metal ion to phosphonate being at least 1:1. It is disclosed that the magnesium and the phosphonate can be premixed in any suitable solvent, including water, optionally mixed with other detergent components and spray-dried. Improved storage stability in bleaching compositions is alleged.

European Patent No. 0 225 309 B1 (Monsanto Europe S.A.) discloses the addition of salts of alkali or alkaline earth metals into particles comprising diethylene triamine penta (methylene phosphonic acid) for the purpose of improving free-flowing and storage properties. The amount of sulphate is 60 percent to 200 percent of the dry weight of the chelant, corresponding to a weight ratio of metal ion salt to chelant of from 0.6:1 to 2:1. Preferred water content after spray-drying is less than 10 percent by weight of the particle.

European Patent Application No. 0 796 911 A1 (The Procter & Gamble Company), published Sep. 24, 1997, discloses a spray-dried component in the form of a free-flowing particle which has high chelant activity. The component comprises: (i) at least 50 percent by weight of a chelant, (ii) from 1 percent to 25 percent by weight of an alkali metal or alkaline earth metal sulphate, and (iii) preferably less than 10 percent by weight free moisture.

However, these and other attempts so far have not been successful in one or more sought after product properties. For example, aqueous chelant solutions are often difficult to dry or when dried they often become caked and/or do not remain free-flowing when exposed to the atmosphere. Thus, although the water content of the chelant composition after spray-drying may be less than 10 percent by weight, these compositions are usually very hygroscopic and would not remain free-flowing after the exposure to the atmosphere.

It is evident that there is still a great need and interest in the detergent industry for stable free-flowing solid chelants.

It has now been surprisingly discovered that a solid chelant which is low to non-hygroscopic and remains free-flowing when exposed to the atmosphere is obtained when the pH of an aqueous chelant solution is first adjusted to the specific narrow pH range and then dried.

In one aspect the present invention is a process for producing a stable free-flowing solid chelant by the steps of (a) adjusting the pH of an aqueous solution of the chelant to a value of from about 1.2 to about 3.0 by the addition of an inorganic acid, and (b) drying the pH adjusted aqueous chelant product.

In another aspect the present invention is a stable free-flowing solid chelant composition obtained by the aforementioned process.

The present invention is particularly suitable for producing chelants, particularly aminocarboxylate chelants, in stable free-flowing solid form.

Any known aminocarboxylate chelant is suitable for use in the process of the present invention. Suitable aminocarboxylate chelants useful in the present invention include, but are not limited to, diethylenetriaminepenta-acetic acid (DTPA), N-hydroxyethylethylenediaminetri-acetic acid (HEDTA), triethylenetetraaminehexaacetic acid (TTHA), N-hydroxyethyliminodiacetic acid (HEIDA), dihydroxyethylglycine (DHEG), ethylenediamine N,N'-disuccinic acid (EDDS), S,S-ethylenediamine N,N'-disuccinic acid (S,S-EDDS), ethylenediaminetetrapropionic acid (EDTP), $\alpha$-alaninediacetic acid, and $\beta$-alaninediacetic acid. Diethylenetriaminepentaacetic acid (DTPA) is a particularly suitable aminocarboxylate chelant.

Any known inorganic acid is suitable for use in the process of the present invention. Suitable inorganic acids include, but are not limited to, sulfuric acid, hydrochloric acid, phosphoric acid, nitric acid. Sulfuric acid is the most preferred acid for use in the process of the present invention.

In the process of the present invention, the acid is slowly added to the aqueous solution of the aminocarboxylate chelant until the pH of the solution is adjusted to the value of from about 1.2 to about 3.0, preferably from about 1.5 to about 2.9, most preferably from about 2.0 to about 2.9. Then, the pH adjusted product is dried to produce stable free-flowing solid aminocarboxylate chelant.

The drying of the pH adjusted aqueous aminocarboxylate chelant product can be done by any conventional drying method. The drying may conveniently be done in a vacuum oven at suitably elevated temperature or by spraying the aminocarboxylate chelant product into a conventional counter-current or co-current spray-drying tower. In the spray-drying tower water is evaporated by hot gas, usually hot air, to such an extent that a solid aminocarboxylate chelant is obtained in a powder or granular form.

The following examples are offered to illustrate but not limit the invention. Percentages, ratios and parts are by weight unless stated otherwise.

COMPARATIVE EXAMPLE C-1

VERSENEX* 80 chelant (a 40.2 percent active solution containing the pentasodium salt of diethylenetriaminepenta-acetic acid) was dried in a vacuum oven at 60° C. After 2 weeks, a small amount of crystalline material had formed but the majority of the material was hard and glass-like in nature. The small amount of the crystalline material was hygroscopic and lost the free-flowing property on exposure to the atmosphere. VERSENEX is a trademark of The Dow Chemical Company.

EXAMPLES 1 TO 4 AND COMPARATIVE EXAMPLES C-2 TO C-7

Mixtures of VERSENEX 80 chelant (20 grams) and deionized water (10 grams) were adjusted with the addition of sulfuric acid to various pH values. Approximately 3 grams of each of the pH adjusted mixtures were dried in a vacuum oven at 60° C. The products were then removed and the drying characteristics, the weight gain and free-flowing properties were determined after 24 hours exposure to the atmosphere. Results are given in Table 1 below.

TABLE 1

| Example | pH | Drying Properties | Weight Gain (24 hrs) | Free-Flowing |
|---|---|---|---|---|
| C-2 | 10.0 | poor | 57% | no |
| C-3 | 7.0 | fair | 28% | no |
| C-4 | 4.3 | OK | 23% | no |
| C-5 | 3.6 | good | 18% | no |
| C-6 | 3.2 | good | 9% | no |
| 1 | 2.9 | good | 2% | yes |
| 2 | 2.0 | good | 1% | yes |
| 3 | 1.5 | good | 3% | yes |
| 4 | 1.2 | good | 6% | major part |
| C-7 | 0.8 | fair | 10% | no |

This data clearly shows the unexpected advantage achieved by the process of the present invention.

COMPARATIVE EXAMPLES C-8 TO C-11

A magnesium sulfate/VESENEX 80 chelant solution was prepared by adding $MgSO_4$ $7H_2O$ (5.93 grams, 0.024 mole) to VESENEX 80 chelant (30 grams, 0.024 mole) containing deionized water (17 grams). The pH was adjusted to approximately 10 by the periodic addition of sulfuric acid. After about 30 minutes a clear magnesium solution was obtained containing a magnesium to chelant molar ratio of 1.0. In a similar manner, solutions were prepared at 0.25, 0.5, and 0.75 moles of magnesium per mole of chelant. Each of the solutions (approximately 3 grams) was then dried in a vacuum oven at 60° C. The products were then removed and the drying properties, the weight gain and free-flowing properties were determined after 24 hours exposure to the atmosphere. Results are given in Table 2 below.

TABLE 2

| Example | Mole Mg/Chelant | $MgSO_4 7H_2O$ in Final Product | Drying Properties | weight Gain (24 hrs) | Free-Flowing |
|---|---|---|---|---|---|
| C-8 | 0.25 | 8.9% | apx. 80% hard/glassy material | 48%* | no |
| C-9 | 0.50 | 17.5% | apx. 30% hard/glassy material | 42%* | no |
| C-10 | 0.75 | 25.6% | good | 38% | no |
| C-11 | 1.0 | 35.0% | good | 30% | no |

*weight gain for the crystalline material.

What is claimed is:

1. A process for producing a stable free-flowing solid aminocarboxylated chelant composition by the steps of (a) adjusting the pH of an aqueous solution of the aminocarboxylated chelant to a value of from about 1.2 to about 3.0 by the addition of an inorganic acid, and (b) drying the pH adjusted aqueous chelant product.

2. The process of claim, 1 wherein the aminocarboxylate chelant is a salt of aminocarboxylic accid aselected from the group consisting of diethylenetriaminepentaacetic acid, N-hydroxyethylethylenediaminetriacetic acid, triethylenetetraaminehexaacetic-acid, N-hydroxyethyliminodiacetic acid, dihydroxyethylglycine, ethylenediamine N,N'-disuccinic acid, S,S-ethylenediamine N,N'-disuccinic acid, ethylenediaminetetrapropionic acid, α-alaninediacetic acid and β-alanine-diacetic acid.

3. The process of claim 2 wherein the aminocarboxylate chelant is diethylenetriaminepentaacetic acid.

4. The process of any one of claims 1, 2 or 3 wherein the inorganic acid is sulfuric acid.

5. The process of any one of claims 1, 2 or 3 wherein the pH of the aqueous solution of the chelant in step (a) is adjusted to a value of from about 1.5 to about 2.9.

6. The process of any one of claims 1, 2 or 3 wherein the pH of the aqueous solution of the chelant in step (a) is adjusted to a value of from about 2.0 to about 2.9.

* * * * *